(No Model.) 2 Sheets—Sheet 1.

W. H. LYONS.
BREECH LOADING ORDNANCE.

No. 433,013. Patented July 29, 1890.

Witnesses
James Campbell
Frank W. Fierle

Inventor
William H. Lyons
By his Attorney
Oscar Buell (No Model.) 2 Sheets—Sheet 2.
W. H. LYONS.
BREECH LOADING ORDNANCE.
No. 433,013. Patented July 29, 1890.
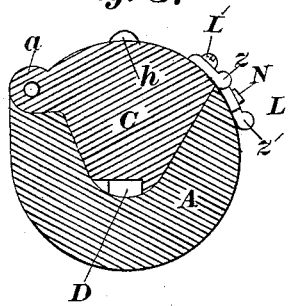
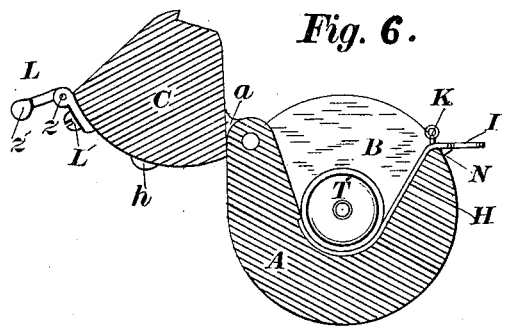
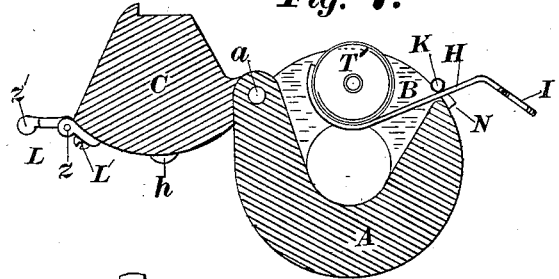
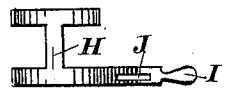
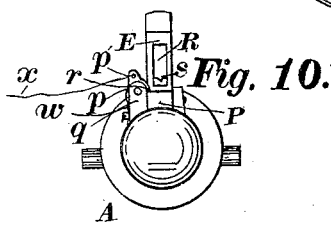
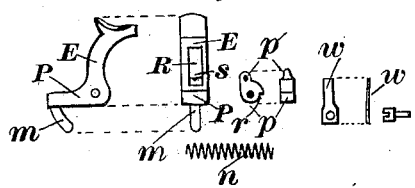
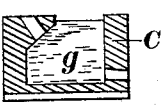
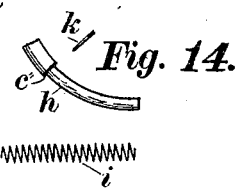
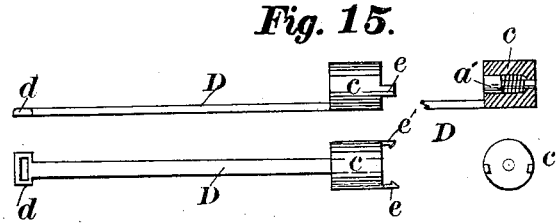
Witnesses
James Campbell.
Frank H. Fiske.
Inventor
William H. Lyons
By his Attorney
Oscar Snell
THE NORRIS PETERS CO., PHOTO-LITHO., WASHINGTON, D. C.

UNITED STATES PATENT OFFICE.

WILLIAM H. LYONS, OF CHICAGO, ILLINOIS, ASSIGNOR OF TWO-THIRDS TO WILLIAM H. LYONS, JR., AND GEORGE W. LYONS, OF SAME PLACE.

BREECH-LOADING ORDNANCE.

SPECIFICATION forming part of Letters Patent No. 433,013, dated July 29, 1890.

Application filed April 11, 1889. Serial No. 306,918. (No model.)

*To all whom it may concern:*

Be it known that I, WILLIAM H. LYONS, a citizen of the United States, residing at Chicago, in the county of Cook and State of Illinois, have invented a new and useful Improvement in Breech-Loading Guns, of which the following is a specification.

My invention relates to that class of breech-loading guns in which the loading, breech-closing, shell-ejecting, and firing mechanism is adapted to both cannon and small arms.

My object is a construction throughout every part of the mechanism which not only gives great strength and durability together with rapidity of fire and adaptability to be used with either fixed or loose ammunition, but which is not so costly as many breech-loading systems in common use. I attain these objects by the mechanism illustrated in the accompanying drawings, in which—

Figure 1:
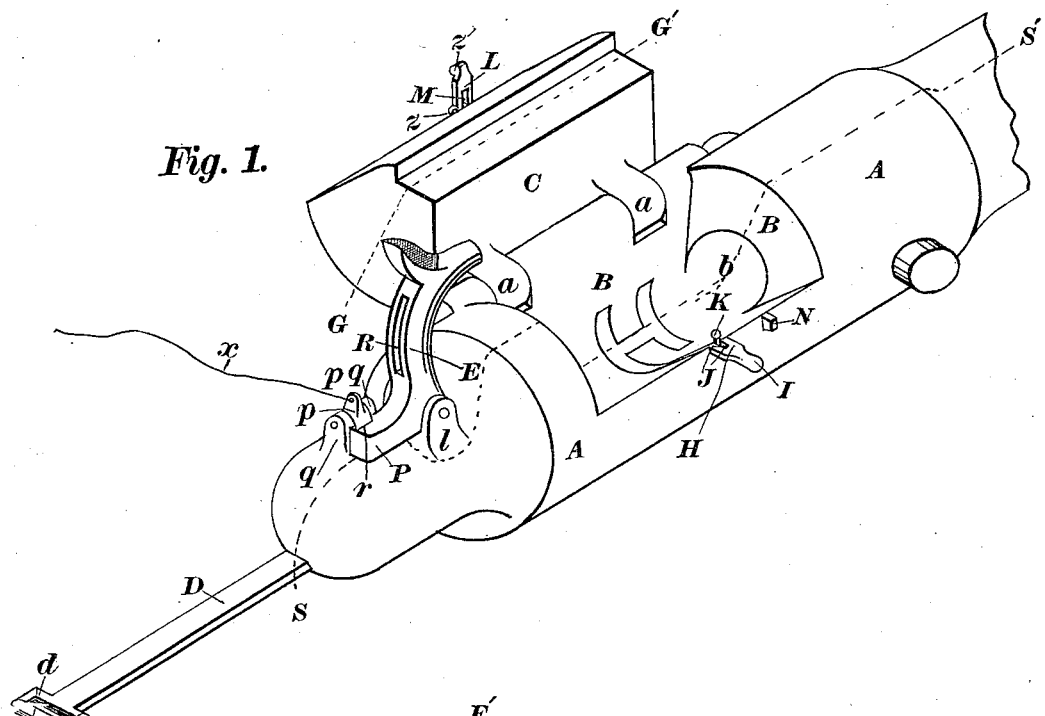
Figure 2:
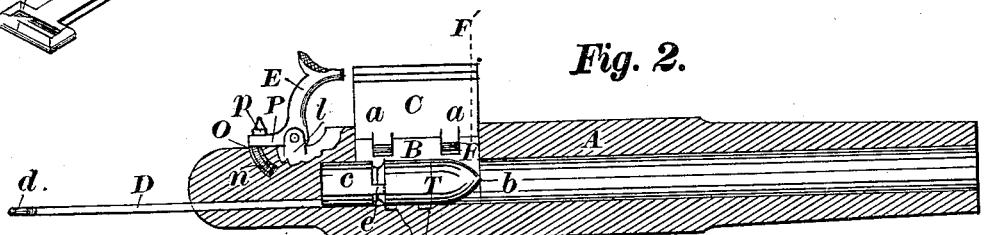
Figure 3:
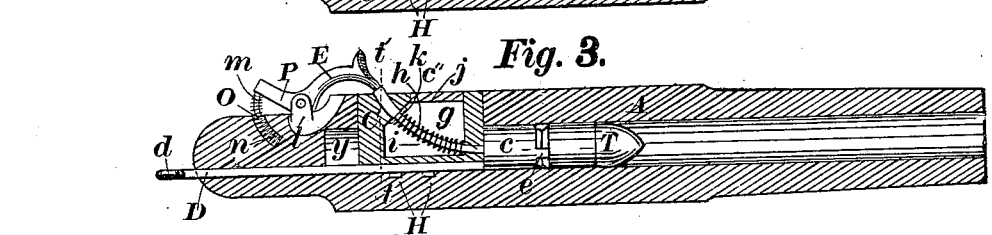
Figure 4:
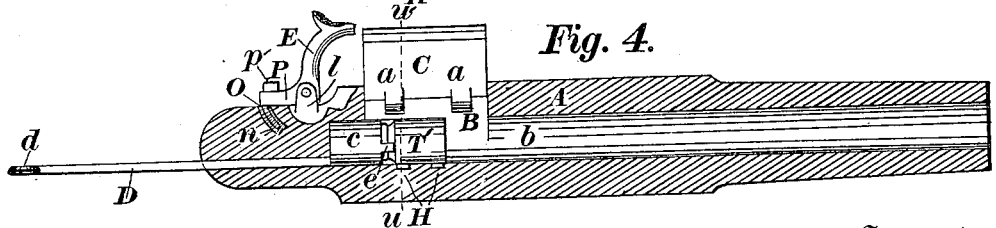

Figure 1 is an isometric perspective view of the breech of the gun with the hammer cocked, breech open ready to receive a charge. Fig. 2 is a longitudinal central vertical section on dotted lines S S', Fig. 1, of the body of the gun, showing first position of the cartridge when the gun is being charged. Fig. 3 is a longitudinal central vertical section on dotted line S S', Fig. 1, of the body of the gun and breech-block when the breech is closed, showing position of parts at the instant of discharge. Fig. 4 is a longitudinal central vertical section on dotted line S S', Fig. 1, with the hammer cocked and breech open, showing cartridge-shell after it has been extracted from cartridge-chamber and is ready to be ejected. Fig. 5 is an end section on line t t', Fig. 3, showing breech-block closed. Figs. 6 and 7 are end sections on dotted line u u, Fig. 4, showing position of cartridge-shell ejector. Fig. 8 is a perspective view of ejector; Fig. 9, top view of ejector. Fig. 10 is a rear view of gun with hammer cocked and the breech closed; Fig. 11, detached views of hammer and minor parts of lock mechanism; Fig. 12, transverse sectional view of breech-block, on line F F', Fig 2; Fig. 13, longitudinal sectional view of breech-block on line G G', Fig. 1; Fig. 14, detached views of main firing-pin and its spring and stop pin; Fig. 15, means for loading and shell-extracting. Figs. 1, 5, 6, 7, 8, and 9 are drawn to the same scale, while Figs. 2, 3, 4, 10, 11, 12, 13, 14, and 15 are drawn to a scale smaller than the ones above referred to.

Similar letters refer to like parts throughout the several views.

A is the body of the gun, which has a mortise B, which mortise in the description given hereinafter I shall call the "receiver." There is a breech-block C attached to the left side of the gun at the top margin of receiver B, by means of hinges a, which permits the breech-block C to be thrown up out of the receiver B and take a position at the left side of the gun, as shown in Fig. 1, or closed down into receiver B, as shown in Figs. 3 and 5.

The construction of the breech-block C is shown by Figs. 1, 3, 5, 12, and 13. The transverse sectional view, Fig. 12, and the longitudinal sectional view, Fig. 13, show a cavity $g$ at the central part of the breech-block C, which is for the purpose of reducing its weight and to provide means by which the curved firing-pin $h$, together with its spiral retracting-spring $i$ and stop-pin $k$, may be readily placed in position or removed for repairs. The cavity $g$ is closed at the top by means of a removable cover $j$. The breech-block is held in a closed position by means of a hinged hasp L, Figs. 1, 5, 6, and 7. One end of hasp L is securely fastened to the breech-block C by means of screws L', while the other end is hinged to the stationary part at $z$. The movable end of the hasp has a mortise M through it, Fig. 1, and there is a projection N, Figs. 1 and 5, on the side of the cannon at the margin of the receiver B, which projection engages the mortise M when the breech-block is closed down into the receiver, and the hasp thus will firmly hold the breech-block in position, as shown in Fig. 5.

The lock or firing mechanism is shown in detail in Fig. 11. The hammer E is hinged on a pin between two lugs $l$ at the breech of the gun. To the under side of the rear projection P of the hammer E is a curved downward projection $m$, which acts as a guide for the spiral main spring $n$. Figs. 2, 3, and 4 show a curved hole at O, which is seat for the main spring $n$. It will be seen that the lower end of the main spring $n$ bears against the bottom of the hole O and the upper end against the rearward projection P of the hammer, the curved downward projection m of the hammer acting to keep the upper end of the spring n in proper place when the hammer is in position shown in Fig. 3.

The trigger p, Figs. 10 and 11, is hinged to lugs q at the left side of the hammer and the trigger's movement is at a right angle to that of the hammer. At the front of the trigger is a notch r, which engages the left side of the rear projection P of the hammer, Figs. 1 and 10. There is a flat spring w whose upper end bears against the trigger p above its pivotal center, which spring is used to throw the trigger-notch r into engagement with the projection P of the hammer and hold the hammer against the pressure of its main spring n in the cocked position, Fig. 1. The trigger has a small hole p' at its top end, into which one end of a lanyard is hooked for firing the gun, Figs. 1 and 10.

The hammer is so constructed that it acts as a rear sight by providing a vertical longitudinal opening or slot R, into which an adjustable sliding rear sight s is fitted, which can be raised or lowered to suit the angle it is desired to elevate or depress the gun, Figs. 10 and 11.

It will be understood that the ammunition to be used in this gun can be of any of the ordinary types of center-fire metallic shell cartridges which have a base-rim by which they can be extracted from the cartridge-chamber b.

The means of transmitting the blow of the hammer to the center fulminating-cap of the cartridge consists of two firing-pins, one of which is shown by the letter h and is curved to the segment of a circle, and passes in a longitudinal downward direction through the breech-block, as shown, Figs. 3 and 13. The position of the hammer at the breech of the gun is such that it does not deliver a direct blow longitudinally with the center of the gun, and in order to allow for this the firing-pin h is made of a curved form, as shown, so that its head, which is struck by the hammer, takes a direction in a line of the blow of the hammer, and the force of the blow is transmitted to the end at the front of the breech-block and in center line with the bore of the gun, Fig. 3.

The firing-pin is shown detached from the breech-block in Fig. 14, where it is seen that the upper end is enlarged for a short distance and ends in a shoulder c'. Just under this shoulder is a hole through which passes the stop-pin k. This pin k acts as a stop to limit the outward movement of the firing-pin h, and is inserted in position after the firing-pin h and its spring i are in position in the breech-block. The spiral spring i surrounds the small part of the firing-pin h, and one end of spring i bears against the lower front end of the cavity g, while the other end of the spring bears against the stop-pin k. The action of spring i retracts the firing-pin into the breech-block after it has been struck by the hammer when the gun is discharged, as will be understood by those skilled in the art of gunnery. There is a second firing-pin a', located in the cylindrical cartridge-chamber plug c, Fig. 15. This plug c answers for the purpose of a cartridge-chamber plug, and at the sides are hooks e e', for extracting the cartridge or empty shell, as will be explained. To the lower side of the rear end of the plug c is secured a rod D, which terminates in a handle d at the rear end. The rod D has a position at the bottom of receiver B, Figs. 2, 3, 4, and 5, and its rear end passes out through an opening provided for it. There is a cylindrical cavity y, Fig. 3, at the rear lower part of receiver B, into which the greater part of the breech-plug c passes when it is pulled out to the greatest distance rearward. This cavity y is for the purpose of holding a greater part of the length of the plug c, to give sufficient space in the length of the bottom of receiver B to take in a loaded cartridge, Fig. 2, without the necessity of increasing the length of the receiver and the consequent increase in both the length and weight of the breech-block C.

The means heretofore mentioned of extracting the empty cartridge-shell from its chamber after the discharge of the gun consists of the hooks e e', Fig. 15, at each side of the plug c. These hooks e e' engage the head of the cartridge when the gun is charged.

The means for ejecting the empty shell from the receiver B is shown by Figs. 1, 6, 7, 8, and 9. This shell-ejector H is made of thin spring-steel of the form shown, and when in position in the receiver B is sunken into grooves so that its upper surface is even with the surface of the receiver, as is plainly shown in Figs. 1 and 6. At I is a handle which projects outward from the side of the gun, and at J is a longitudinal slot into which is fitted a round-headed pin K, which pin is screwed solidly into the body of the gun at the edge of the receiver. The head of pin K stands a short distance above the upper face of the extractor, Figs. 1, 6, and 7, so as to give a small amount of play between the ejector and the head of the pin.

In operating this gun, suppose the breech is closed, cartridge-chamber empty, and the hammer down. The hammer is first drawn back, which compresses the spiral spring n. When the hammer is at full-cock, the notch r of the trigger p engages the projection P of the hammer and holds it in the cocked position shown in Figs. 1, 2, and 4. The end z' of the hinged hasp L of the breech-block C is next pulled upward, turning on its hinge z, which disengages the mortise M from the projection N, Figs. 1 and 5, when the breech-block C can be turned up out of the receiver B to the position shown in Figs. 1 and 2. The rod D is now pulled out rearward, and with it the attached plug c, which plug takes its position with a greater part of its length in the cavity y at the rear end of the receiver B.

The cartridge T is now placed in the bottom of the receiver B to the position shown in Fig. 2, the head of the cartridge being in contact with the front end of plug c and the rim in engagement with the hooks e e', Fig. 15, when the rod D is pushed in, which forces the plug c and the cartridge T entirely within the cartridge-chamber b. The breech-block is now swung over and down into position and locked by means of the hasp L and projection N, when, if the lanyard x is pulled the hammer will strike the firing-pin h, and it striking firing-pin a' will fire the cartridge and discharge the gun. The position of the operative parts is shown in Fig. 3 at the instant of discharge.

If it is desired to eject the empty shell, the hammer is cocked, the breech-block thrown open, as before described, and the rod D pulled out to its fullest extent, when the hooks e e' being engaged with the rim of the head of the empty cartridge-shell, the shell will be withdrawn from its chamber b and be pulled out into the receiver B, directly over the arms of the ejector H, Figs. 4 and 6, when the several parts will have the position shown in Fig. 4. The empty shell T' is now thrown out of the receiver B by grasping the handle I of the ejector H, when, by a quick outward and downward pull, the shell will be thrown up to the position shown in Fig. 7, and clear out of the receiver to the ground.

What I claim as my invention, and desire to secure by Letters Patent, is—

1. In a breech-loading gun, a firing-pin $h$, bent and operating in the segment of a circle, for the purpose as shown and described.

2. In a breech-loading gun, a firing-pin $h$, bent to the segment of a circle, a spiral spring $i$, to retract said firing-pin $h$, in combination with a stop-pin $k$, and hollow breech-block $c$, when the whole is arranged in the manner and for the purpose as described.

3. In a breech-loading gun, a hammer E, having a rear projection P, with a projection $m$, conforming to the segment of a circle having the pivotal center of said hammer E as the center, in combination with a spiral main spring $n$, and segmental spring-seat O, arranged in the manner and for the purpose as shown and described.

4. In a breech-loading gun, a hammer E, having a longitudinal slot R, in combination with a firing-pin $h$, curved to the segment of a circle, and a hollow breech-block C, arranged in the manner and for the purpose described.

5. In a breech-loading gun, a receiver B, a breech-block C, hinged to the side of said receiver B, so as to open sidewise, breech-plug $c$, with extractor-hooks $e$ and handle D of said breech-plug $c$ operating in the bottom of said receiver B, said handle D extending out to the rear of the gun, for the purpose hereinbefore described.

Chicago, Illinois, April 9, 1889.

WILLIAM H. LYONS.

Witnesses:
NORMAN ROBINSON,
FRANK W. GAMMELL.